United States Patent

Dunham et al.

[15] 3,695,223

[45] Oct. 3, 1972

[54] ALL PURPOSE BELT COATER

[72] Inventors: Milo A. Dunham, Elmira; Donald F. Hardy, Horseheads, both of N.Y.

[73] Assignee: Dart Industries, Inc., Los Angeles, Calif.

[22] Filed: July 28, 1970

[21] Appl. No.: 62,218

[52] U.S. Cl. ..................118/217, 118/218, 118/233, 118/239, 118/257
[51] Int. Cl..............................................B05c 1/14
[58] Field of Search.......118/257, 239, 233, 217, 218, 118/219, 223, 226

[56] References Cited

UNITED STATES PATENTS

| | | |
|---|---|---|
| 249,029 | 11/1881 | Du Brul..................118/257 X |
| 506,184 | 10/1893 | McDonald.............118/233 X |
| 988,335 | 4/1911 | Harbeck................118/257 X |
| 1,786,437 | 12/1930 | Lehman......................118/233 |
| 2,868,162 | 1/1959 | Knain ......................118/239 X |

Primary Examiner—John P. McIntosh
Attorney—Leigh B. Taylor, Michael L. Dunn, Paul R. Wylie and Harold R. Beck

[57] ABSTRACT

An apparatus for coating an article having a cross section of any shape. The apparatus includes two coating portions. In one of the portions, the article is rotated against a backplate by a coating belt and in the other portion, the article is coated by two belts having surfaces which conform to the shape of the article.

12 Claims, 5 Drawing Figures

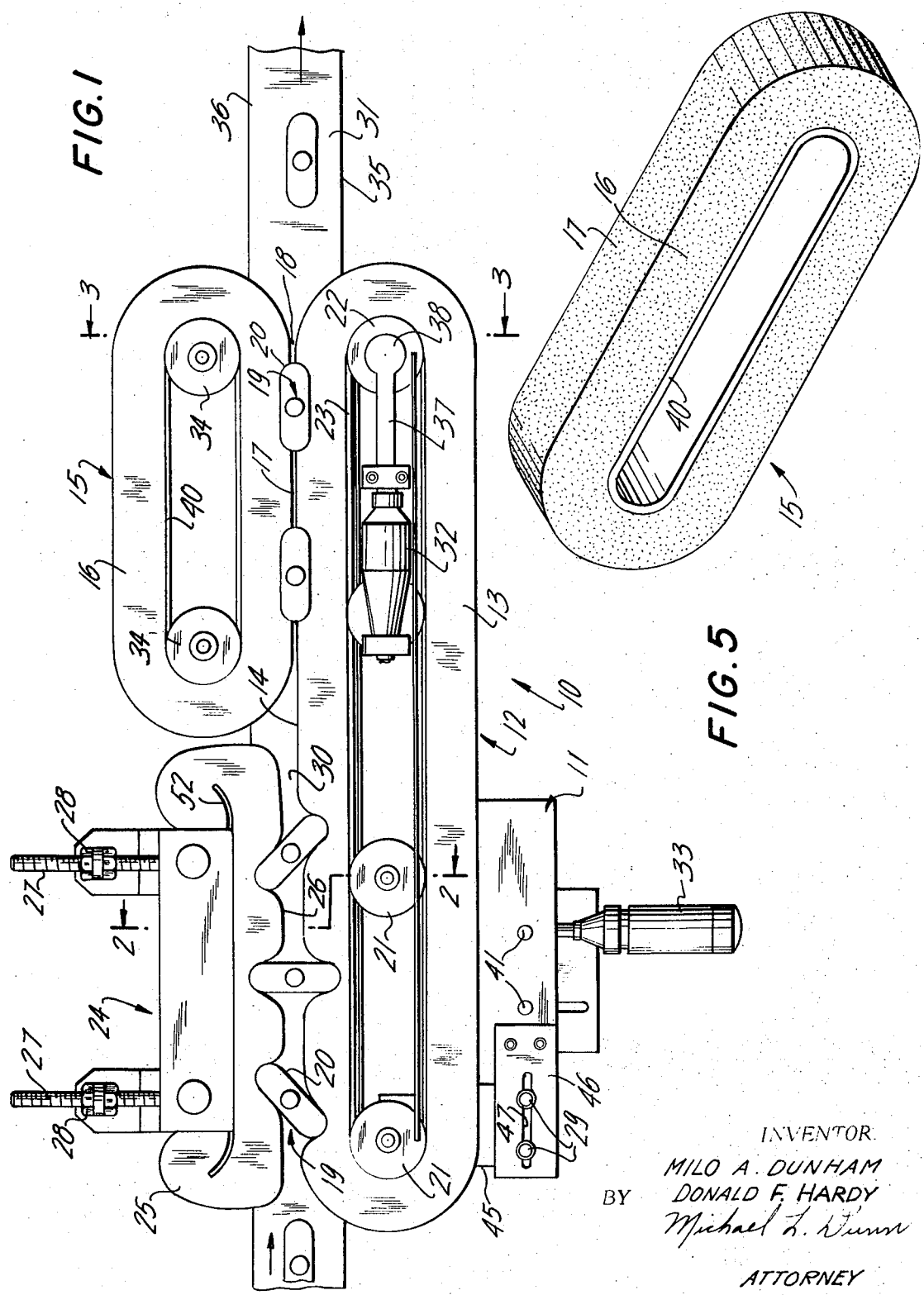

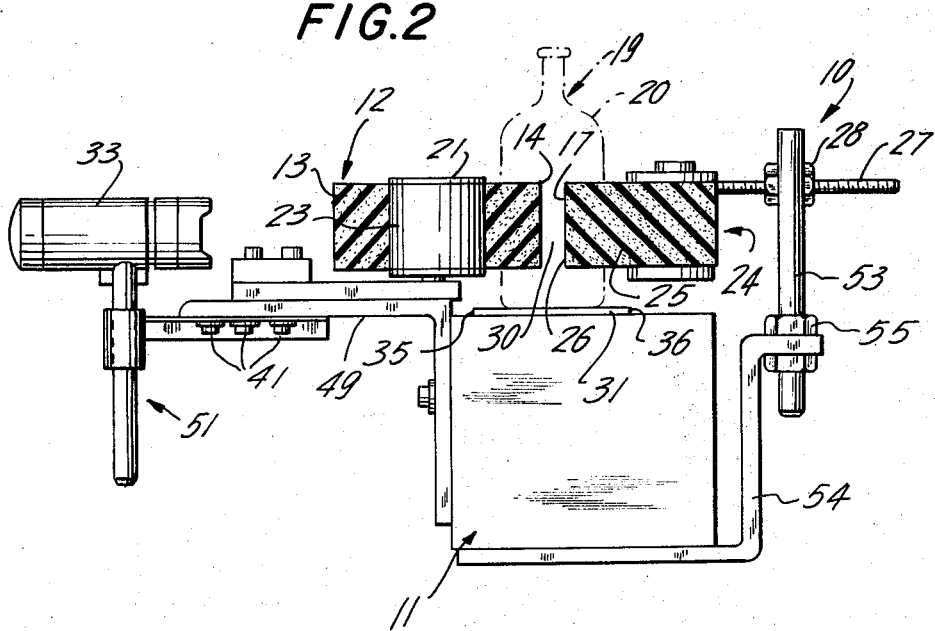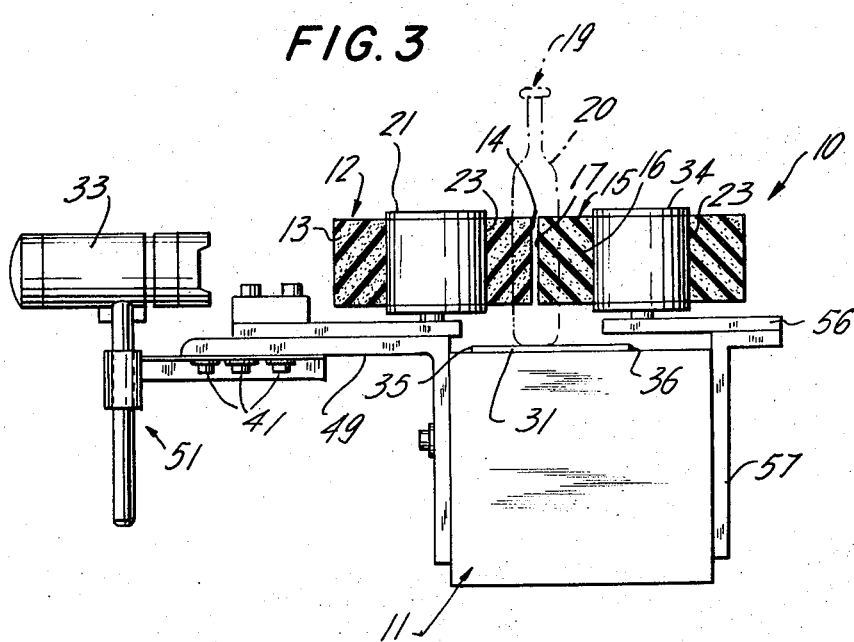

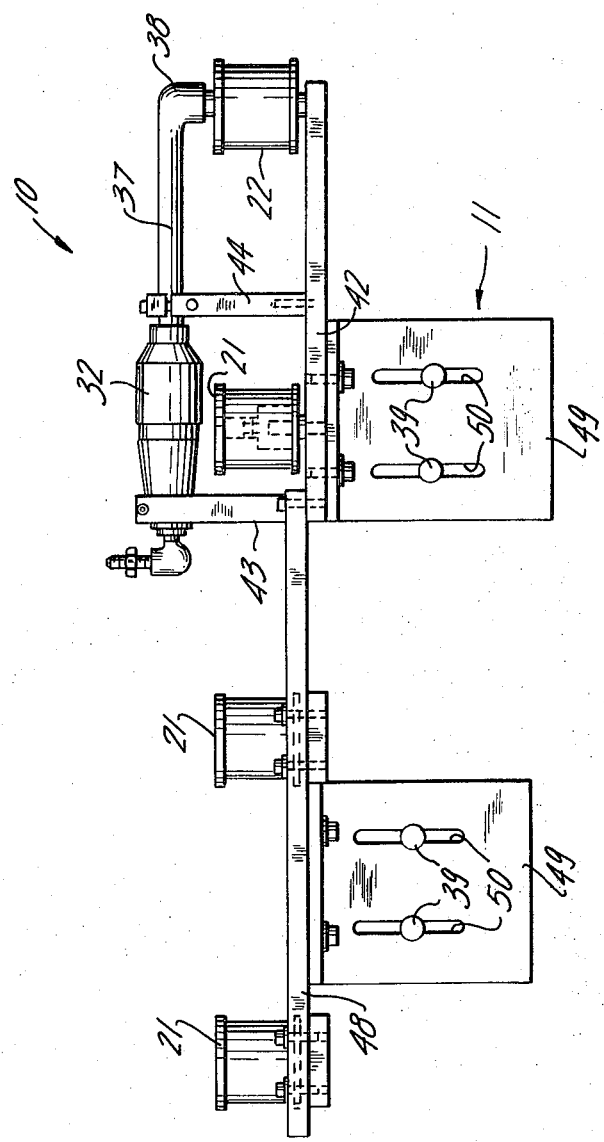

ALL PURPOSE BELT COATER

BACKGROUND OF THE INVENTION

1. Field of Invention

This invention concerns a novel apparatus for coating articles having various cross sections and relates more particularly to a process and machine for coating the outside peripheral surface of glass bottles.

2. Description of the Prior Art

Coating of articles is done for a variety of reasons such as decoration, protection from corrosion, or to preserve article strength. Glass bottles and other articles made of breakable materials may have spots or places in their shapes which could be weakened by external abuse. It was known in the prior art that spray coating these articles helped to preserve their strength. Spray coating had many disadvantages. The articles, such as glass bottles were not always completely coated by the spray and the spray would often hit undesirable areas. When the spray method of coating articles was used, there was limited control over where the coating would be applied on the article to be coated and it was difficult to place a heavier coating where the greatest protection was desired.

Other industries utilizing coating for decoration and protection recognized that spray coating had serious disadvantages and coating mechanisms were devised in an attempt to avoid the disadvantages of spray coating. The mechanisms devised had many undesirable characteristics. The machines could not be easily and quickly adapted to accept articles having different shapes and sizes. The machines generally could not be mounted on a standard conveyor system. Often the coated surfaces were contacted by parts of the machine after the coating was applied. Almost invariably the machines had complicated and expensive structures such as; overhead belts with expensive supporting frames, complicated guide tracts, spindles and spindle carrying mechanisms, complicated conveyor systems, and gravity feed mechanisms with intricate control systems. Although some machines were adjustable to handle articles having different shapes and sizes often the adjustments took a great deal of time and heavy machine parts had to be lifted or lowered. In addition to the above disadvantages none of the devices were able to apply coatings on a single predetermined area of the article being coated.

A new process for coating articles such as glass bottles has recently been disclosed. The new process comprises driving the coating surface of an applicator belt against the surface of the article thereby rotating the article against a stationary backplate. The new process and apparatus for accomplishing the process is an improvement over prior art methods of coating articles such as glass bottles. The new process and apparatus does however have disadvantages. It has been found that the apparatus is only suitable for coating articles having substantially circular cross sections. Even when a thick foam layer is used in the backplate and applicator belt the article rotates a plurality of times only with difficulty. Another applicator belt having a thick foam layer has been substituted for the backplate in an attempt to cause the applicator belt to conform to the shape of the article and coat the article, without having to rotate the article. This attempt to avoid rotation has not been completely effective since the belts do no completely coat the peripheral surface of the article.

BRIEF DESCRIPTION OF THE INVENTION

This invention relates to an apparatus for coating the peripheral surface of an article such as a glass bottle. The apparatus includes two coating portions. In one of the portions the article is rotated against a backplate by a coating belt and in the other portion the article is coated by two belts having surfaces which conform to the shape of the article, the article does not rotate. The surface of the belts may be any suitable material for paint coaters, but is preferably polyurethane foam. The flexible backing of the belt may be any strong flexible material such as burlap, nylon, rubber or flexible plastic.

An object of this invention is to provide an apparatus for completely coating a predetermined portion of the peripheral surface of an article having an irregular cross section.

Another object of this invention is to provide an apparatus for coating a predetermined area on the peripheral surface of an article having an irregular cross section with the edges of the coated area being well defined.

Another object of this invention is to provide an apparatus for coating an article which may have any of a variety of cross sections.

Another object of this invention is to provide an apparatus for completely coating a predetermined area on the peripheral surface of an article having an irregular cross section without rotating the article a plurality of times.

Other objects of this invention will become apparent throughout the following specification wherein:

FIG. 1 is a top plan view of the novel apparatus.

FIG. 2 is a cross sectional view taken on line 2—2 of FIG. 1.

FIG. 3 is a cross sectional view taken on line 3—3 of FIG. 1.

FIG. 4 is an elevational side view of the apparatus without the belts and

FIG. 5 is a perspective view of one of the belts.

PREFERRED EMBODIMENT

In accordance with this invention an article such as a glass bottle of any shape is coated by rotating the article one-half turn between a stationary backplate and a major applicator belt. The article is then further coated by transporting the article between the major belt and a minor belt. Each belt has a surface which will conform to the surface of the article and the distance between the belts is small enough to permit coating by each belt. The coating which is applied may be for strength, decoration, or protection.

As seen in FIG. 1, article 19 which may be a bottle is transported to a position between backplate 24 and major applicator belt 12. Any transporting means may be used although a conveyor 31 is preferred. The major applicator belt 12 comprises a foam layer 13 attached, preferably by lamination, to a flexible backing 23. The belt 12 has a coating surface 14 for applying a coating to the peripheral surface 20 of article 19. The flexible backing 23 can be made of any suitable material such as rubber, plastic, or fabric such as burlap. Major applicator belt 12 is driven about a first series of spools 21 which may be located along conveyor edge 35. At least one of the spools of series 21 is a drive spool 22. Drive spool 22 is driven by air motor 32 which is mounted to base plate 42 as seen in FIG. 4, by means of motor clamp 43 and motor support 44. The motor 32 is connected to spool 22 by means of shaft 37 and right angle gear 38. As seen in FIG. 1, the major applicator belt may be tightened or loosened by sliding adjustable spool plate 45 in slotted base 46. Adjustable spool plate 45 is mounted in spool plate slot 47 by means of spool plate bolts 29. The spools in series 21 are rotationally mounted to base plate 48. Base plate 48 is bolted to mounts 49 which are in turn mounted to conveyor frame 11. Major applicator belt 12 can be readily raised and lowered by raising and lowering mounts 49. Mounts 49 are provided with mount slots 50 which permit mounts 49 to be secured by mount bolts 39 in varying elevational positions.

Major applicator belt 12 is supplied with coating material from coating spray head 33 which, as best seen in FIG. 2 and 3 is secured to one of the mounts 49 by means of spray head support assembly 51 and bolts 41.

Stationary sponge backplate assembly 24 has rigid plate 52 covered by a foam layer 25. Backplate assembly 24 is provided with coating surface 26 which may also be the surface of foam layer 25. Foam backplate surface 26 is mounted in a position substantially parallel to and facing a portion of coating surface 14 of major applicator belt 12 and so that the space 30 between coating surface 14 and coating surface 26 will permit both surfaces to contact the peripheral surface 20 of the article 19 in all rotational positions of the article. The combined thickness of the major belt foam layer 13 and the backplate foam layer 25 is thick enough to deform and permit rotation of article 19 between the foam surfaces.

Backplate assembly 24 may be moved closer to or farther away from coating surface 14 by means of backplate supports 27 which are secured to support 53 by means of adjustment nuts 55. Backplate assembly 27 may be raised or lowered by raising support 53 which is secured to frame segment 54 by means of adjustment nuts 55. Frame segment 54 is bolted to frame 11.

The apparatus 10 is also provided with a minor application belt 15 having a foam layer 16 attached to a flexible backing 40 and a coating surface 17. The coating surface 17 may be the surface of foam layer 16. At least a portion of the coating surface 17 is parallel to and facing a portion of coating surface 14 of major belt 12. The space 18 between coating surfaces 14 and 17 permits the coating surfaces of each belt to contact peripheral surface 20 of article 19. Minor belt 15 is mounted upon a second series of spools 34 which are in turn rotationally mounted to base plate 56. Spools 34 may be located along second conveyor edge 36. Base plate 56 is bolted to mounts 57 which is in turn bolted to conveyor frame 11. It is preferred that the combined thickness of foam layers 13 and 16 be enough to permit article 19 to sink into the foam layers thus permitting the coating surfaces 14 and 17 to conform to the peripheral surface 20 of article 19. It is possible that the combined thickness be great enough so that almost the entire peripheral surface 20 can be coated by belts 12 and 15. In operation article 19 is carried by conveyor 31 to a position between backplate 24 and major belt 12. Major belt 12 engages surface 20 of article 19 rotating the article one-half turn along backplate 24. As article 19 rotates, the entire peripheral surface 20 of the article is coated by backplate surface 26 and major belt surface 14. Article 19 is then carried by conveyor 31 and major belt 12 to the space between major belt 12 and minor belt 15. The surfaces of the belts then conform to and coat surface 20 of article 19. Major belt 12 is provided with coating material by means of spray head 33. Minor belt 15 may be provided with coating material from another spray head. Backplate 24 is generally provided with coating material which has been transferred by article 19 from major belt 12.

What is claimed is:

1. An apparatus for coating an article having a cross section of any shape, said apparatus comprising:
   a. a frame
   b. a major applicator belt having a foam layer and a coating surface,
   c. a minor applicator belt having a foam layer and a coating surface, at least a portion of the coating surface of said minor belt being parallel to and facing a portion of the coating surface of said major belt, the space between said belts permitting the coating surface of each of said belts to contact the peripheral surface of said article,
   d. a plurality of spools rotatably mounted to said frame for mounting said belts,
   e. a backplate having a foam layer and a coating surface, said backplate being mounted to said frame in a position so that at least a portion of said backplate coating surface is parallel to and facing a portion of the coating surface of said major belt and so that the space between the coating surface of said backplate and the coating surface of said major belt will permit both the backplate coating surface and the major belt coating surface to contact the peripheral surface of the article in all rotational positions of the article, the combined thickness of said major belt foam layer and said backplate foam layer being large enough to permit rotation of the article between the backplate and major belt surfaces,
   f. means for transporting said article through the spaces between said major belt surface and said backplate surface and between said major belt surface and said minor belt surface,
   g. means for driving said belts, and
   h. means for supplying coating material to said coating surfaces.

2. The apparatus claimed in claim 1 wherein the surface of the foam layer of the major applicator belt is also the coating surface.

3. The apparatus claimed in claim 1 wherein the surface of the foam layer of the minor applicator belt is also the coating surface.

4. The apparatus claimed in claim 1 wherein the surface of the foam layer of the backplate is also the coating surface.

5. The apparatus claimed in claim 1 wherein the combined thickness of the foam layers of the minor applicator belt and of the major applicator belt permits the coating surface of each belt to conform to the peripheral surface of the article.

6. The apparatus claimed in claim 5 wherein the combined foam thickness permits the coating surfaces to conform to and coat substantially the entire peripheral surface of the article.

7. The apparatus claimed in claim 1 wherein said article has an irregular cross section.

8. The apparatus claimed in claim 1 wherein said article has an elliptical cross section.

9. The apparatus claimed in claim 8 wherein said article has a circular cross section.

10. An apparatus for coating an article having an irregular cross section comprising:
   a. a frame
   b. a conveyor mounted to said frame
   c. a first series of spools rotatably mounted to said frame proximate one edge of said conveyor, said first series of spools extending substantially the entire length of said apparatus,
   d. a continuous major applicator belt having a foam layer and a coating surface, said major belt being mounted on said first series of spools, so that said coating surface faces outwardly,
   e. a backplate having a foam layer and a coating surface, said backplate being mounted to said frame proximate the other edge of said conveyor in a position substantially parallel to and facing a portion of said coating surface of said major applicator belt and so said backplate is separated from said coating surface by a distance which will permit both the backplate coating surface and the major applicator belt coating surface to contact the peripheral surface of the article, the combined thickness of said major belt foam layer and said backplate foam layer being large enough to permit rotation of the article between said surfaces,
   f. a second series of spools rotatably mounted to said frame proximate said other edge of said conveyor and proximate said backplate in a position substantially parallel to said first series of spools,
   g. a continuous minor belt having a foam layer and a coating surface mounted on said second series of spools so a portion of the coating surface of said minor belt faces the coating surface of said major belt, the distance between said belts permitting the coating surface of each of said belts to contact the peripherals surface of said article as said article moves between said belts,
   h. at least one drive means mounted to said frame,
   i. a connecting means for transmitting the energy of said drive means to at least one of the spools of said first series and,
   j. a means for supplying coating material to the surface of said major applicator belt.

11. The apparatus claimed in claim 10 wherein the combined thickness of the foam layers of the minor belt and the major belt permits the coating surface of each belt to conform to the peripheral surface of the article.

12. The apparatus claimed in claim 10 wherein the surfaces of said foam layers are also the coating surfaces.

* * * * *